(Model.)

J. N. BLAIR.
Car Coupling.

No. 235,728. Patented Dec. 21, 1880.

WITNESSES:
C. Neveux
C. Sedgwick

INVENTOR:
J. N. Blair
BY Munn & Co
ATTORNEYS.

N. PETERS, PHOTO-LITHOGRAPHER, WASHINGTON, D. C.

UNITED STATES PATENT OFFICE.

JOSEPH N. BLAIR, OF SLIPPERY ROCK, PENNSYLVANIA.

CAR-COUPLING.

SPECIFICATION forming part of Letters Patent No. 235,728, dated December 21, 1880.

Application filed October 12, 1880. (Model.)

*To all whom it may concern:*

Be it known that I, JOSEPH N. BLAIR, of Slippery Rock, in the county of Butler and State of Pennsylvania, have invented a new and Improved Car-Coupling, of which the following is a specification.

This invention relates to self-acting couplings; and it consists of a draw-bar containing two longitudinally-hinged spring-actuated dogs set a little apart, with their sloping faces opposite each other, thereby forming a central wedge-shaped opening, into which the coupling-link is entered to be caught and held on shoulders at the rear of the dogs; and it consists, further, of a segmental lever for throwing the dogs apart to uncouple the cars.

Figure 1:
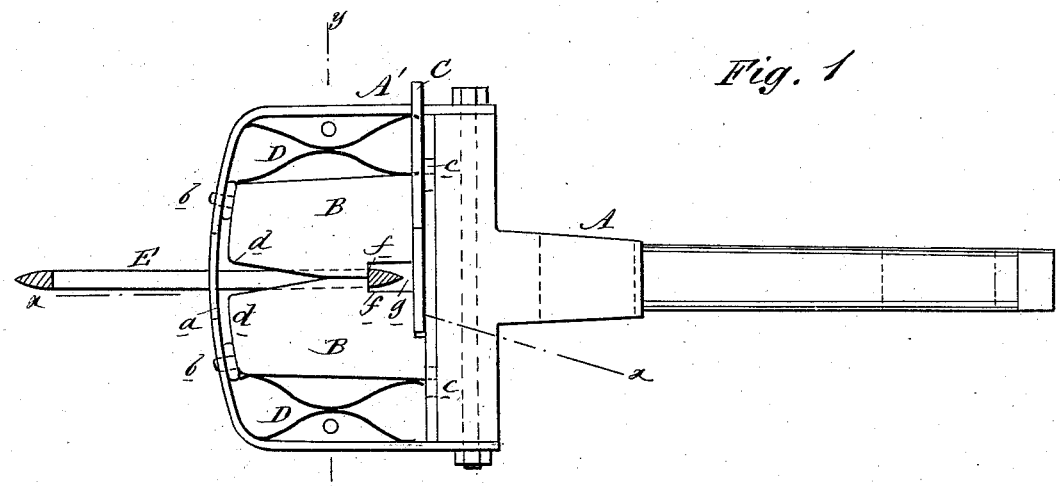
Figure 2:
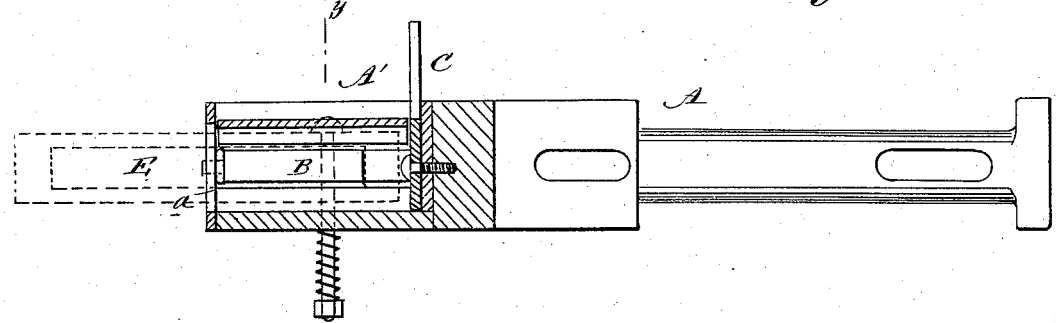
Figure 3:
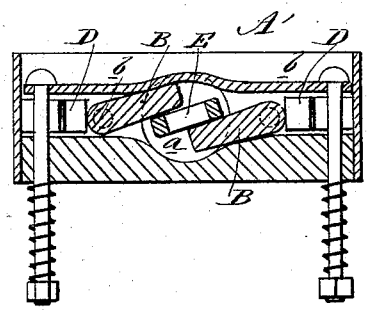
Figure 4:
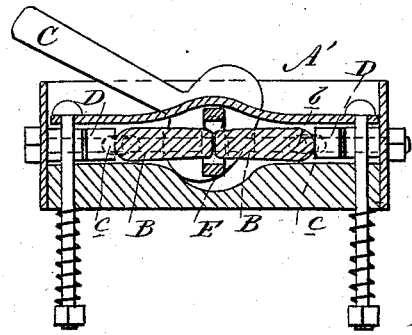
Figure 5:
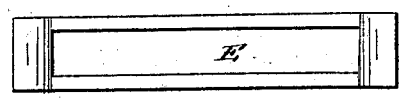

Figure 1 is a plan of the device with the top of the draw-bar removed. Fig. 2 is a longitudinal section on line $x\,x$, Fig. 1. Fig. 3 is a cross-sectional elevation on line $y\,y$, Figs. 1 and 2, showing one position of the coupling-link and dogs. Fig. 4 is a cross-sectional elevation on line $y\,y$, Figs. 1 and 2, showing another position of the coupling-link and dogs. Fig. 5 is a plan of the coupling-link.

Similar letters of reference indicate corresponding parts.

In the drawings, A represents the draw-bar, provided with a hollow head, A', in the center of the front of which is a circular link-opening, $a$. On either side of this opening $a$ rods $b\,b$ extend rearward from the face to the back of the draw-head A', and have their rear ends inserted in the transverse sockets $c\,c$. On these rods $b\,b$ are fixed, by their straight outer edges, the dogs B B in such a manner that their inner faces are in contact with each other as said dogs B B lie flat, as shown in Figs. 1 and 4. The inner edges of these dogs B B slope outward from their centers to their front ends, as shown at $d\,d$, thereby forming a wedge-shaped opening for the entrance of the coupling-link, and from their centers to their shoulders $f\,f$ the edges of said dogs B B are straight and in contact with each other. The formation of the shoulders $f\,f$ leaves an opening, $g$, between the dogs B B at their rear ends, and in this opening $g$ is fitted the end of the lever C, that is pivoted in the back part of the draw-head A', and has its handle projecting upward within reach of the operator. This lever C has an oval or ellipsoidal end centrally pivoted, so that when said lever C is turned aside, as shown in Figs. 1 and 4, with an extremity of the oval or ellipse in the opening $g$, the dogs B B will close together and hold the coupling-link E, while if the lever C be moved in an upright position, as shown in Fig. 2, the oval or elliptical end of said lever C is thrown transversely across the opening $g$, with the effect of throwing the dogs B B apart and releasing the coupling-link E.

D D represent springs fixed within the draw-head A', between the sides thereof and the straight edges of the dogs B B, whereby said dogs B B are held together to hold the coupling-link E.

E represents a rectangular coupling-link with flat beveled ends.

In operating this device said coupling-link E is turned up on its edge and entered through the opening $a$ of the draw-head A' between the dogs B B, and is caught and held by the shoulders $f\,f$. To uncouple, the lever C is turned aside and the dogs B B are thereby pushed apart to permit the said link to be withdrawn for uncoupling.

Should a car leave the track the link E will turn and press one dog B up and the other dog B down, as shown in Fig. 3, and thereby be released, thus uncoupling the cars automatically, and by so doing preventing the cars in the rear from being dragged off the track, thereby saving property and preventing serious accident.

With this device cars can be coupled automatically without the risks to life and limb incident upon going between the cars for that purpose, and uncouple automatically when one of them is accidentally thrown from the track, while by well-known and simple mechanical appliances to the lever C the operator can uncouple the cars from the ends, sides, or tops thereof.

Having thus described my invention, I claim as new and desire to secure by Letters Patent—

1. An improved car-coupling constructed substantially as herein shown and described, consisting of draw-bar A, longitudinally-hinged spring-actuated shouldered dogs B B, and lever C, operating together as set forth.

2. In a car-coupling, the combination, with the hollow draw-head A', of the longitudinally-hinged spring-actuated square-shouldered dogs B B, provided with sloping inner edges, substantially as herein shown and described.

3. In a car-coupling, the combination, with the dogs B B, constructed and arranged substantially as herein described, of the oval or ellipsoidal lever C, as set forth.

JOSEPH NEWTON BLAIR.

Witnesses:
 F. S. PETERS,
 CHARLES PROSSER.